United States Patent [19]

Lubarsky

[11] Patent Number: 4,890,279

[45] Date of Patent: Dec. 26, 1989

[54] MULTIPLEXER AND COMPUTER NETWORK USING THE SAME

[75] Inventor: Daniel P. Lubarsky, San Jose, Calif.

[73] Assignee: Pacific Bell, San Francisco, Calif.

[21] Appl. No.: 249,519

[22] Filed: Sep. 26, 1988

[51] Int. Cl.⁴ .......................................... H04Q 11/04
[52] U.S. Cl. .................................. 370/58.1; 370/65; 370/15
[58] Field of Search .............................. 370/58, 65, 15

[56] References Cited

U.S. PATENT DOCUMENTS

4,649,533  3/1987  Chorley et al. ....................... 370/58
4,663,759  5/1987  Mukaemachi et al. ............... 370/65

Primary Examiner—Douglas W. Olms
Assistant Examiner—Alpus H. Hsu
Attorney, Agent, or Firm—McCubbrey, Bartels, Meyer & Ward

[57] ABSTRACT

An improved computer network multiplexer is disclosed. In a computer network based on the multiplexer, a master computer can communicate with a plurality of slave computers such that each slave computer receives all data sent by other slave computers to the master computer.

3 Claims, 4 Drawing Sheets

MULTIPLEXER AND COMPUTER NETWORK USING THE SAME

BACKGROUND OF THE INVENTION

The present invention relates to computer networks and more particularly to a computer network architecture that provides reduced overhead.

One common form of computer network comprises a master computer and a plurality of slave computers. The master computer is coupled to the slave computers through a multiplexer which copies outgoing messages from the master computer to each of the slave computers and ORs the messages from the individual slave computers to provide a single data stream back to the master computer. Since the slave computer messages are combined using an OR operation, the network protocol must be set up in a manner that guarantees that no more than one slave computer will attempt to communicate with the master computer at any given time.

Typically, this is accomplished using a polling protocol. In a computer network of this type, each slave computer is assigned a unique address. The master computer sends messages that are addressed either to all of the slave computers or to a specified slave computer. The slave computers communicate with the master computer only in response to a command from the master computer that enables such communication. For example, the master computer sends a message to the first slave computer instructing it to send its data to the master computer. When this slave computer has sent all of the data requested, it sends a command signaling the end of its transmission. The master computer then enables the second slave computer by sending it a command instructing it to send its data, and so on.

Protocols of this type require a substantial amount of overhead. The computer network is essentially time-shared between the sleeve computers. Each slave computer is polled in sequence, whether or not it has data to send to the master computer. Each time a save computer is polled, the master computer must first send an enabling message. Most of the time, the slave computer will have nothing to send in response, i.e., it will reply with an end of data message which requires a time approximately equal to that required by the request for data message. Hence, the request for data message can be almost 50% of the information communicated on the network.

One solution to reducing this overhead would be to provide a second communication channel for each slave computer which allowed each slave computer to listen to the communication between any selected slave computer and the master computer. This second channel would require a separate communication path to each of the slave computers, on which the transmissions from all the slave computers were repeated. If such a channel were present, the next slave computer to communicate with the master computer would only need to listen for the end of data message from the currently selected slave computer before beginning its transmission. That is, the master computer would send a single enabling message to the first slave computer. The transmission from the first computer to the master computer would be monitored by the remaining computers in the computer network. As soon as the first slave computer sent its end of data message, the second slave computer would begin transmitting its data, and so on. In this way, the overhead arising from repeatedly sending the enabling message would be eliminated.

Unfortunately, the cost of creating this second communication channel can be quite high in computer networks in which the individual computers are in widely separated geographic areas. Such computer networks often utilize the telephone lines as part of the computer network. Providing additional lines to connect each of the slave computers is economically unattractive.

Broadly, it is an object of the present invention to provide an improved computer network architecture.

It is another object of the present invention to provide a computer network in which the time spent sending enabling messages is significantly reduced without the need for a secondary communication channel consisting of a separate line to each of the slave computers.

These and other objects of the present invention will be apparent to those skilled in the art from the following detailed description of the invention and the accompanying drawings.

SUMMARY OF THE INVENTION

The present invention comprises a computer network which utilizes an improved form of multiplexer. The computer network includes a plurality of data processors connected by the multiplexer. The multiplexer includes a plurality of slave ports. Each slave port is used to connect the multiplexing to a bi-directional communication link. Each slave port receives data on the bi-directional communication link and transmits data thereon. The multiplexer also includes a master port for combining data received by each slave port and for transmitting the combined data on a master bi-directional communication link. The master port also includes circuitry for receiving data on the master bi-directional communication link and transmitting the data so received on each the slave port. In addition, the multiplexer includes a loopback circuit connected to the master bi-directional communication link for receiving data transmitted by said master port on the master bi-directional communication link, said loopback circuit transmitting the data so received on said master bi-directional communication link such that said data is received by said master port. At least three of the data processors in the computer network are coupled to three different slave port means of the multiplexer, each data processor being so coupled by a bi-directional communication link.

DETAILED DESCRIPTION OF THE INVENTION

Figure 1:
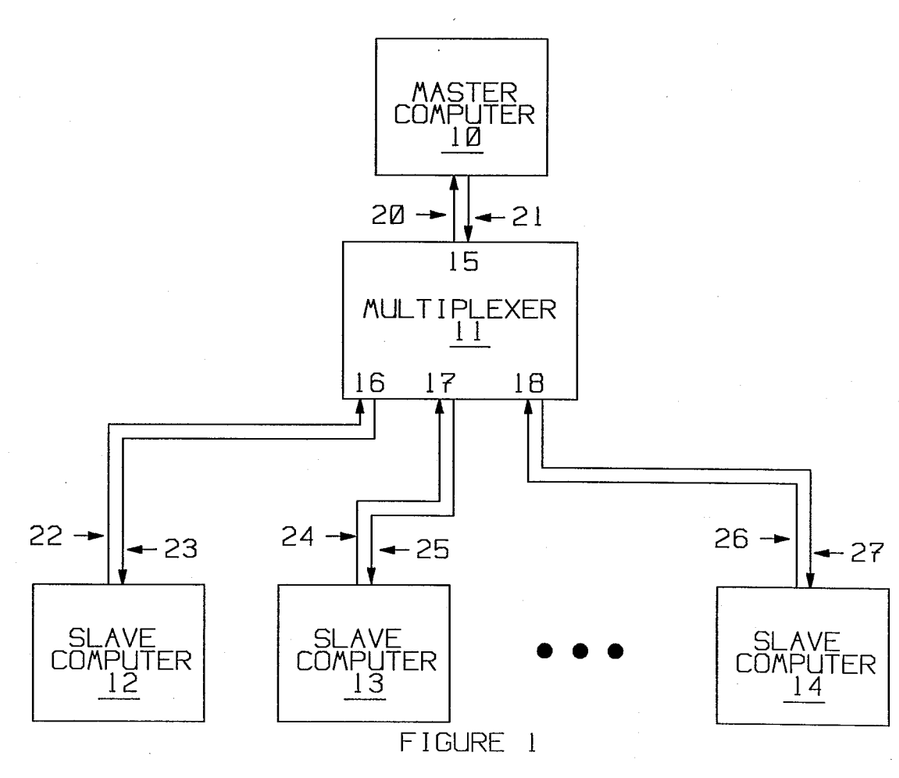
FIG. 1 is a block diagram of a computer network which may be implemented in a telephone system.

The present invention may be most easily understood with reference to FIG. 1 which is a block diagram illustrating a typical computer network of a type that might be implemented in a telephone system according to the prior art. The network consists of a master computer 10, and a number of slave computers. Exemplary slave computers are shown at 12-14. Master computer 10 is connected to master port 15 on a multiplexer 11 via a bi-directional data link consisting of data lines 20 and 21. Slave computer 12 is connected to slave port 16 on multiplexer 11 via a similar bi-directional data link consisting of data lines 22 and 23. Similarly, slave computer 13 is connected to slave port 17 on multiplexer 11 via a bi-directional data link consisting of data lines 24 and 26, and slave computer 14 is connected to slave port 18 on multiplexer 11 via a bi-directional data link consisting of data lines 26 and 27. Multiplexer 11 copies incoming data from master port input line 21 to all of its outgoing slave lines 23, 25, and 27. The data on the incoming slave lines 22, 24, and 26 are ORed together by multiplexer 11 and transmitted to master computer 10 on outgoing master port line 20.

Figure 2:
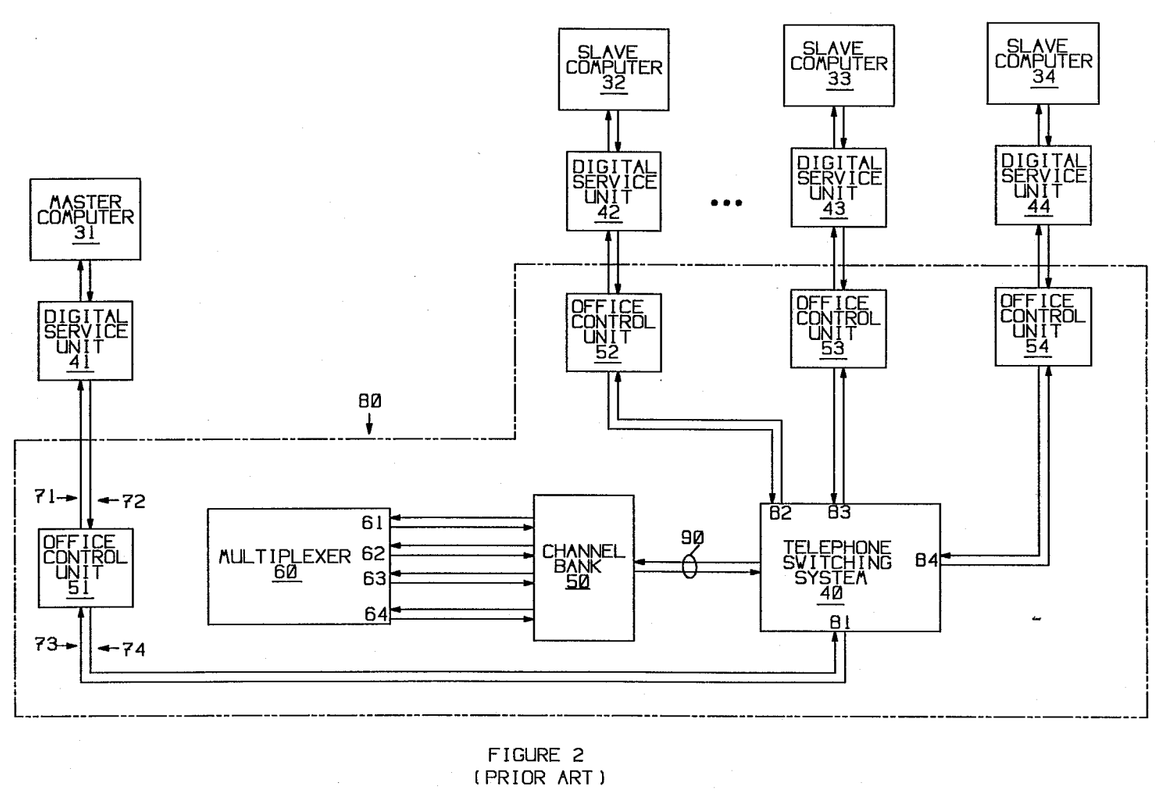
FIG. 2 is a block diagram of a telephone system based implementation of the computer network shown in FIG. 1 as practiced in the prior art.

A block diagram of a prior art telephone system based implementation of a computer network similar to the above described network is shown in FIG. 2. The computer network consists of a master computer 31 and three slave computers 32-34. Master computer 31 and each of the slave computers 32-34 are coupled to telephone system 80 through a series of interface units and telephone lines. The connecting link between each computer and its telephone system central office is referred to as a digital service unit. Exemplary digital service units are shown at 41-44. Each digital service unit is coupled to a telephone system central office through a 4-wire service, one pair of wires being used to transmit data to the central office and one pair of wires being used to receive data from the central office. Each pair of wires is typically a subscriber loop of the type used for conventional voice transmission. Exemplary subscriber loops are shown at 71 and 72.

At the telephone system central office serving the geographical area in which each computer is located, the 4-wire service from each digital service unit is interfaced to a $T_1$ service through an office control unit connected to the telephone switching system. Exemplary office control units are shown at 51-54. Each office control unit coverts the data from the data format used on the 4-wire service to a format that is compatible with a $T_1$ service within telephone system 80.

Each $T_1$ communication link within telephone system 80 consists of a bi-directional time-domain multiplexed communication link having 24 outgoing time-domain multiplexed channels for transmitting data in one direction thereon and 24 incoming time-domain multiplexed channel for transmitting data in the reverse direction. The data for each computer is placed in an outgoing channel of a $T_1$ communication link connected to the office control unit in question. The $T_1$ communication links in question are connected to telephone switching system 40, which switches data between the various channels of the various $T_1$ communication links in the telephone system. In general, telephone switching system 40 consists of a number of cross-connect switches and associated hardware. This hardware is located in different geographic areas within telephone system 80; however, to simplify the figure, telephone switching system 40 is shown as a single block.

Multiplexer 60 provides functions analogous to multiplexer 11 shown in FIG. 1. Multiplexer 60 has a master port 61 and slave ports 62-64. Each port provides bi-directional communication. Data which is input to master port 61 is output on slave ports 62-64. Data which is input on the slave ports is ORed together and output on master port 61. Multiplexer 60 may be located at any convenient point in telephone system 80. The data to be processed my multiplexer 60 is placed in the appropriate channels of a single $T_1$ communication link 90 by telephone switching system 40. The data on communication link 90 is demultiplexed by a channel bank 50.

Hence, it may be seen that data from master computer 31 is coupled through digital service unit 41. From there, it is coupled via subscriber loop 72 to master office control unit 51 located at a telephone system central office. Office control unit 51 provides the interface from 4-wire service to $T_1$ service, taking the data coming into it from master computer 31 on subscriber loop 72 and transmitting it through outgoing $T_1$ communication link 74 to telephone switching system 40. Switching system 40 routes the data from master computer 31 to the incoming line of master port 61 of multiplexer 60. Multiplexer 60 copies the incoming data from master port 61 to the outgoing lines of each of its slave ports 62-64. The data from the outgoing lines of slave ports 62-64 is time domain multiplexed by channel bank 50 and placed on the outgoing line of communication link 90. This data is transmitted back through switching system 40 to office control units 52, 53, and 54, respectively, where it is interfaced back to 4-wire service. The data is then coupled through digital service units 42, 43, and 44 to slave computers 32, 33, and 34, respectively. In this way, the data transmitted by the master computer is received by all of the slave computers, and the specific slave computer addressed by any particular message is then able to respond.

Similarly, it can be seen in FIG. 2 that each of the slave computers 32, 33, and 34 is coupled to a digital service unit (42, 43, and 44, respectively). The data from each digital service unit is then transmitted via a subscriber loop to an office control unit (52, 53, and 54, respectively). From each office control unit 52, 53, and 54, the data is transmitted through $T_1$ communication links to ports 82, 83, and 84, respectively, of switching system 40. Data coming into switching system 40 from slave computers 32, 33, and 34 is placed in the appropriate channels of communication link 90. The data in question is then demultiplexed by channel bank 50 which places the data on the incoming lines of slave ports 62, 63, and 64, respectively, of multiplexer 60.

The data on all of the incoming lines of slave ports 62-64 of multiplexer 60 is Ored together. This ORed data is then transmitted on the outgoing line of master port 61. The data in question is placed in the appropriate outgoing channel of communication link 90 by channel bank 50. Telephone switching system 40 routes this data to a channel on port 81 of switching system 40. From port 81 of switching system 40, the ORed data is transmitted through outgoing $T_1$ communication link 73 to office control unit 51. Office control unit 51 again provides the interface from $T_1$ to 4-wire service, transmitting the ORed data from the slave computers through outgoing subscriber loop 71 to digital service unit 41, and from there to master computer 31. In this way, data from all of the slave computers is received by the master computer.

As noted above, data from the various computers in the computer network is carried on various $T_1$ communication links within the telephone system. The telephone switching system routes the data that is to be combined by multiplexer 60 to a single $T_1$ communication link 90. Each of the data streams which is to be so combined is transmitted on $T_1$ communication link 90 in a different time-domain multiplexed channel thereof. The data contained in the various channels of $T_1$ communication link 90 are separated by channel bank 50. Channel bank 50 places the data from each channel of $T_1$ communication link 90 on a separate bi-directional communication path. Those paths that contain data to be combined by multiplexer 60 are connected to the appropriate ports of multiplexer 60.

For the purposes of this discussion, the channels of $T_1$ communication link 90 which carry data toward channel bank 50 will be labeled $I_1$ through $I_{24}$ and those channels which carry data from channel bank 50 will be labeled $O_1$ through $O_{24}$. As shown in FIG. 2, multiplexer 60 utilizes four of these channels in each direction. It will be assumed that master port 61 is connected to channel 1 and that slave ports 62-64 are connected to channels 2-4, respectively. Multiplexer 60 ORs the data on the input portion of channels 2-4 and transmits the combined data on the output portion of channel 1, i.e., $$O_1 = I_2 + I_3 + I_4$$

In the reverse communication direction, multiplexer 60 merely copies the data on the input portion of channel 1 to the output portion of channels 2-4, i.e., $$O_2 = O_3 = O_4 = I_1.$$

As will be apparent to those skilled in the art, in a computer network such as that described above, transmissions from the master computer can be heard by each of the slave computers; however, transmissions from the individual slave computers can be heard only by the master computer. Consequently, in order to prevent simultaneous transmissions from multiple slave computers, it is necessary for each slave computer to wait for a polling command from the master computer before initiating a transmission. Such polling commands take up a significant amount of time, thus increasing the overhead of the computer network.

Ideally, each slave computer should be able to hear the transmissions from all the other slave computers. This would enable the Nth slave computer in the sequence to begin transmitting as soon as (N-1)st slave computer had completed its transmission, thus eliminating the need for separate polling commands from the master computer. As noted above, prior art schemes for allowing each slave computer to hear the transmissions from the other slave computers have been impractical, particularly when applied to networks spanning large geographic areas. The present invention provides a practical solution to this problem.

Figure 3:
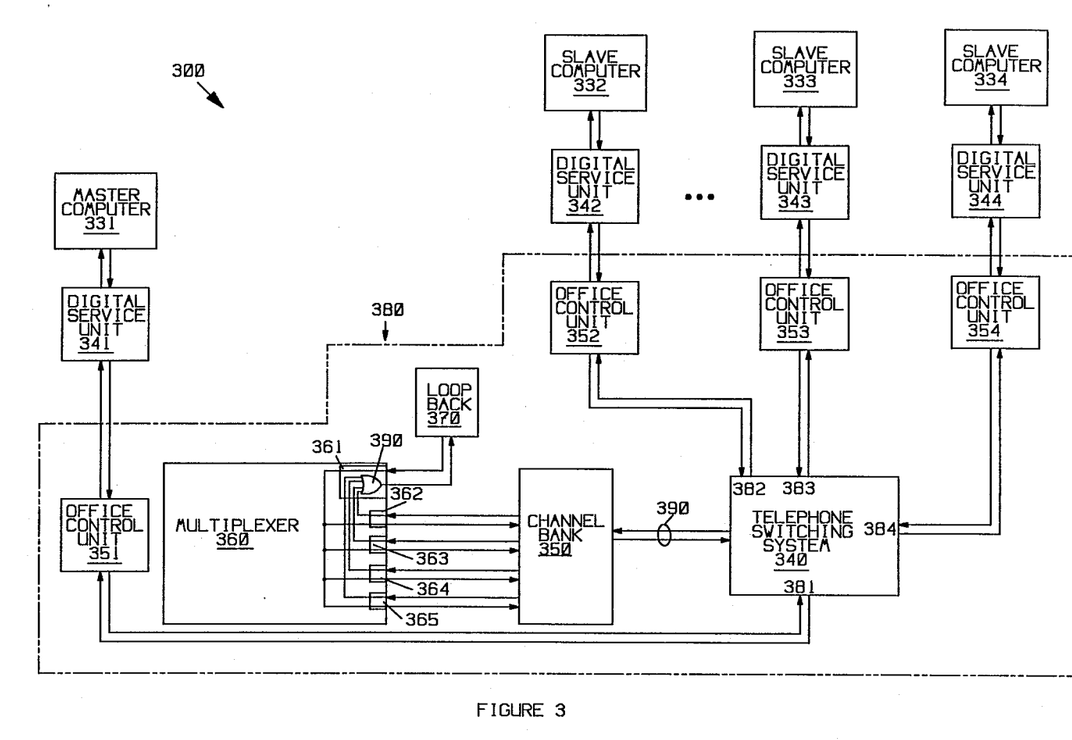
FIG. 3 is a block diagram of a telephone system based network according to the present invention.

The method by which the present invention solves this problem may be more easily understood with reference to FIG. 3 which illustrates a computer network 300 according to one embodiment of the present invention. This embodiment implements a computer network having the same overall configuration as that shown in FIG. 2, i.e., one master computer and three slave computers. Those elements in FIG. 3 that are identical to elements used in FIG. 2 have been given the same element numbers preceded by a 3. The multiplexer 360 in computer network 300 differs from multiplexer 60 shown in the prior art computer network illustrated in FIG. 2 in that multiplexer 360 has a master port 361 and four slave ports, 362-365.

Multiplexer 360 also differs in the manner in which it is connected into the computer network. In computer network 300, the master computer is connected to one of the slave ports of multiplexer 360. This is accomplished by reprogramming telephone switching system 340 to place the data from the master computer on the channel of $T_1$ communication link 390 that is connected to the slave port in question, in this case slave port 365. Master port 361 of multiplexer 360 is connected to a loopback circuit 370.

Loopback circuits are often included in various network units such as the office control units and digital service units as a diagnostic tool for tracking signal flow in a computer network when problems arise. A loopback circuit copies all data received at its input port back to its output port.

Before examining the effect of the loopback circuit on the data flow between the various computers in the computer network, the effect of connecting the master computer to a slave port of the multiplexer will be examined. The signals transmitted by master computer 331 and by slave computers 332, 333, and 334 are interfaced through telephone switching system 340 and channel bank 350 to slave ports 365, 362, 363, and 364, respectively, of multiplexer 360. Multiplexer 360 includes an OR circuit 390 which which is shown as part of master port 361 and which ORs all of the signals received at the inputs to its slave ports, and transmits the resulting data stream back on the output line of master port 361. This ORed data stream includes the data from all of the slave computers, as before. In addition, it also includes the data from master computer 331, which was input to the multiplexer on slave port 365.

The ORed data stream output by multiplexer 360 on master port 361 is sent to loopback circuit 370. Loopback circuit 370 copies the ORed data stream from its input to its output; from there, it is returned to the input line of master port 361. Multiplexer 360 operates in a manner similar to that described with reference to multiplexer 60 shown in FIG. 2. That is, it sends all data received at the input of master port 361 out through slave ports 362, 363, 364, and 365. In this way, the ORed data stream is received by each of the slave computers, and by the master computer.

Thus, the data transmitted from master computer 331 to any slave computer 332, 333, or 334, is received by all of the slave computers, as previously. In addition, the data transmitted to master computer 331 from any slave computer 332, 333, or 334 is received by each of the slave computers 332-334 as well as by master computer 331.

Since each slave computer, as well as the master computer, can hear the data being transmitted to the master computer by the other slave computers, each slave computer can transmit its data in turn, without the necessity of being polled by the master computer before transmitting. When one slave computer has completed its transmission by sending an end of data message, the next slave computer in the sequence can immediately begin its transmission. If a slave computer has no data to transmit, it just sends an end of data message, which signals the next computer in the chain that its turn has come.

It should be noted that, in this embodiment of a computer network according to the present invention, multiplexer input port 365, to which master computer 331 is coupled, is in no way differentiated from multiplexer input ports 362, 363, and 364, to which slave computers 332, 333, and 334, are coupled; i.e., all computers in the network are treated similarly in the manner in which they are coupled in and out of multiplexer 360 through channel bank 350. Neither digital service unit 341, office control unit 351, nor port 365 on multiplexer 360, through which the data from master computer 331 is coupled, differs in any significant way from those elements through which the data from the slave computers is coupled. Since the master computer's data is input to the multiplexer through a slave port and gets ORed into the data stream that is passed through the loopback circuit, it should be evident to those skilled in the art that any computer in the computer network can be assigned the role of master computer at any time. This feature provides an additional cost-saving benefit of the present invention, by making the intervention of telephone company personnel unnecessary in effecting such a change. This feature is particularly useful in implementing computer networks in which the function of "master computer" is switched between computers at different times of the day or days of the week. Previously, whenever it was necessary to remove the designated master computer from service, telephone system personnel were required to reroute the connections between the telephone switching system and the various computers in the network in order to transfer a slave computer to master computer status. This aspect of the present invention negates the necessity for such rerouting.

It will be apparent to those skilled in the art that loopback circuit 370 could be located at any place in the telephone system, provided it is connected to the master port in the manner described above. For example, loopback circuit 370 could be located in a different central office from that in which multiplexer 360 is located. In this case, master port 361 would be connected to a channel bank 350. The data in the channel to which master port 361 is connected would then be routed to the loopback circuit via the telephone switching system.

In addition, loopback circuit 370 could be located within multiplexer 360. In this regard, it should be noted that loopback circuits are often included in network components as diagnostic aids. Such a loopback circuit could also be used to provide the loopback function in the present invention provided the loopback is made such that data that would be transmitted from the master port is copied back to the master port.

The embodiment of the present invention shown in FIG. 3 represents the simplest scheme for practicing a network according to the present invention. Unfortunately, some computer networks are set up assuming a particular architecture which is incompatible with the embodiment of the present invention shown in FIG. 3. The architecture in question consists of a set of rules which make certain diagnostic functions more convenient. For example, in some networks, it is assumed that the master port of the multiplexer is connected to the master computer through an office control unit. The particular configuration of these networks, i.e., number of computers and manner in which the computers are connected, may be ascertained at any time by sending commands to the network units, i.e., the digital service units, office control units, etc.

The software responsible for this type of function assumes that the master port of every multiplexer in the network is connected to an office control unit which is, in turn, connected to a digital service unit. Hence, placing a loopback circuit on the master control port of the multiplexer in place of the office control unit connected to the master computer would present difficulties when telephone technicians needed to ascertain the specific network configuration.

Figure 4:
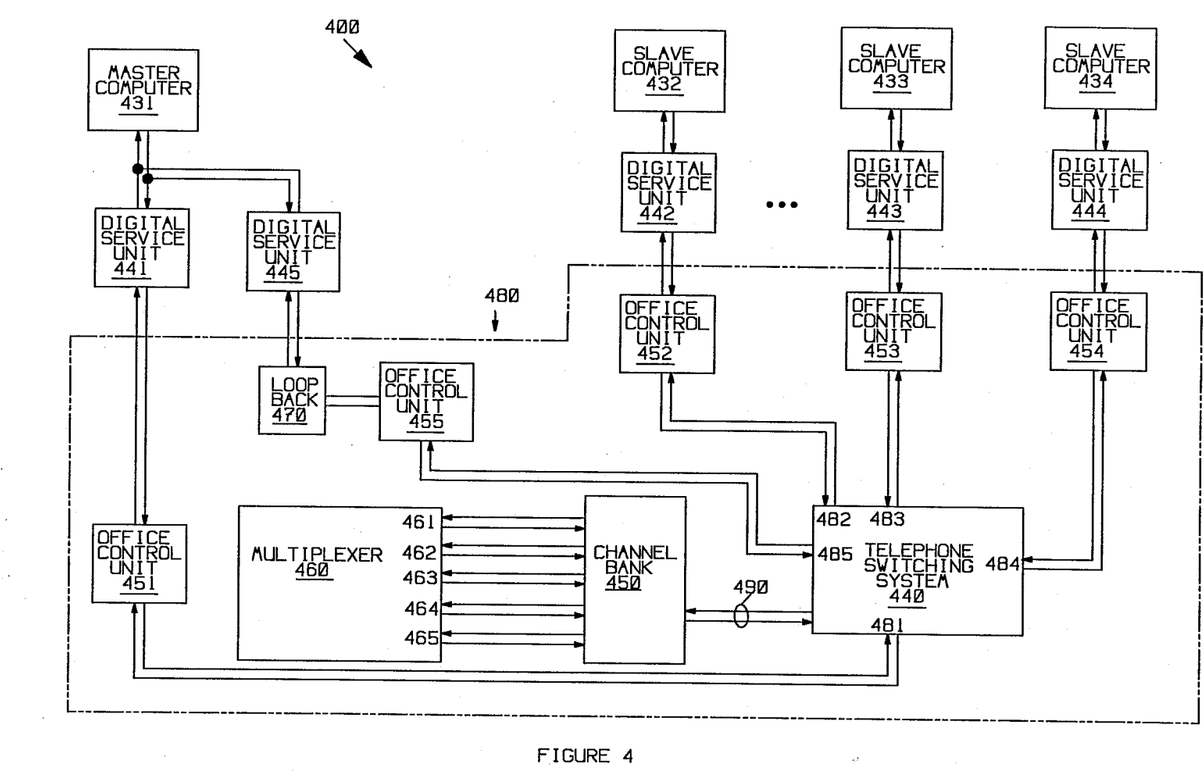
FIG. 4 is a block diagram of a preferred embodiment of a computer network according to the present invention.

An alternate embodiment of the present invention that preserves the conventional architecture while allowing each slave computer to hear the communications between the other slave computers and the master computer is illustrated in FIG. 4 at 400. Those elements in FIG. 4 that are identical to elements used in previous figures have been given the like element numbers.

Data transmitted by master computer 431 is coupled to two digital service units 441 and 445. From each of these digital service units 441 and 445, the data from master computer 431 is transmitted to separate office control unit (451 and 455, respectively) located at a telephone system central office. From each of these two office control units 451 and 455, the data is transmitted through $T_1$ communication links to telephone switching system 440. To simplify FIG. 4, the data from office control units 451 and 455 is shown reaching telephone switching system 440 by different $T_1$ communication links; however, it will be apparent to those skilled in the art that the data from each office control unit can be routed to telephone switching system 440 on separate channels of the same $T_1$ communication link.

Data from office control units 451–455 arriving at telephone switching system 440 on ports 481–485 is routed by telephone switching system 440 into the appropriate channels of $T_1$ communication link 490. Data arriving at ports 481, 483, and 484 of telephone switching system 440 is transmitted through channel bank 450 to the inputs of slave channels 462, 463, and 464, respectively, of multiplexer 460, as previously. The data from master computer 431 arriving via office control unit 451 is routed to slave port 465. The data from master computer 431 arriving via office control unit 455 is routed to master port 461 of multiplexer 460. The data on all of the incoming slave channels to multiplexer 460, including the master data on slave channel 465, is ORed together. The ORed data stream is output from multiplexer master port 461 through channel bank 450 to port 485 of telephone switching system 440. From port 485, the ORed data designated for the master computer is transmitted to office control unit 455. However, office control unit 455, in this embodiment of the present invention, drives loopback circuit 470, which copies back all data that appears at its output to the input of office control unit 455, i.e., the ORed transmissions from the master computer and all of the slave computers.

The loop-backed data from office control unit 455 is then returned to the input of port 485 of telephone switching system 440. From there it is coupled through channel back 450 to the input of master port 461 of multiplexer 460. Multiplexer 460, treating the ORed data stream input to master port 461 as if it were a transmission originating from the master computer, copies it to the outgoing lines of all of the slave ports 462, 463, 464, and 465. From the outputs of slave ports 462–465 of multiplexer 460, the ORed data is coupled back through channel bank 450 to the respective ports of telephone switching system 440. The data from port 482 is sent to slave computer 432. Likewise, the data from ports 483 and 484 are sent to slave computers 433 and 434 respectively. And finally, the data from port 481 is sent to master computer 431.

Because that data stream received at the input of master port 461 of multiplexer 460 consists of the ORed transmissions from the master computer and all of the slave computers, it can be seen that transmissions from all of the slave computers, as well as from the master computer, will be received by all of the slave computers as well as by the master computer. Hence, this embodiment of the present invention provides the benefits of the previously described embodiment while preserving the desired network architecture. The cost of preserving the desired architecture is the same as that associated with adding one additional slave computer to the computer network, i.e., an additional digital service unit, office control unit, and the communication links needed thereby.

Although loopback circuit 470 is shown as a separate circuit in FIG. 4, it will be apparent to those skilled in the art that loopback circuit 470 can be part of office control unit 455. Such loopback circuits are normally included in office control circuits for diagnostic purposes. Hence, the present invention can be practiced by commands to office control unit 455 which cause office control unit 455 to enter its loopback mode. When telephone technicians wish to determine the topology of the computer network, all loopbacks in the network are normally disconnected. Hence, the loopback will not interfere with such network diagnostic functions.

In networks having large numbers of computers, a plurality of multiplexer units may be used. In this case, the multiplexers are connected together such that each multiplexer is connected to at least one other multiplexer by linking a slave port on the first multiplexer to a slave port on the second multiplexer.

Although the present invention has been described with reference to a multiplexer which ORs the data input thereto, it will be apparent to those skilled in the art that other methods of combining the individual slave data streams to form a single data stream which is transmitted to the master computer may be used.

Accordingly, there has been described herein a novel computer network. Various modifications to the present invention will become apparent to those skilled in the art from the foregoing description and accompanying drawings. Accordingly, the present invention is to be limited solely by the scope of the following claims.

What is claimed is:

1. A multiplexer circuit for coupling a plurality of data processors in a computer network such that each data processor receives all data transmitted by the other said data processors, said multiplexer circuit comprising:

a plurality of slave port means, each said slave port means providing means for connecting said multiplexing circuit to a bi-directional communication link, each said slave port including means for receiving data on said bi-directional communication link and means for transmitting data on said bi-directional communication link;

master port means, connected to each said slave port means, for combining data received by each said slave port means and for transmitting said combined data on a master bi-directional communication link, said master port means further comprising means for receiving data on said master bi-directional communication link and means for coupling the said data received on said master bi-directional communication link to the said transmitting means of each said slave port means; and loopback means connected to said master port means by said master bi-directional communication link for receiving data transmitted by said master port means on said master bi-directional communication link and for transmitting the data so received on said master bi-directional communication link back to said master port means on said master bi-directional communication link such that said data is received by said master port means on said master bi-directional communication link.

2. The multiplexer circuit of claim 1 wherein said combining means included in said master port means comprises means for ORing the data received by each said slave port means.

3. A computer network comprising:

a plurality of data processors and multiplexing means, said multiplexing means comprising means for coupling said data processors, said multiplexer means including a plurality of slave port means, each said slave port means providing means for connecting said multiplexing means to a bi-directional communication link, each said slave port including means for receiving data on said bi-directional communication link and means for transmitting data on said bi-directional communication link;

master port means, connected to each said slave port means, for combining data received by each said slave port means and for transmitting said combined data on a master bi-directional communication link, said master port means further comprising means for receiving data on said master bi-directional communication link and means for coupling the said data received on said master bi-directional communication link to the said transmitting means of each said slave port means; and loopback means connected to said master port means by said master bi-directional communication link for receiving data transmitted by said master port means on said master bi-directional communication link and for transmitting the data so received on said master bi-directional communication link back to said master port means on said master bi-directional communication link such that said data is received by said master port means on said master bi-directional communication link, wherein each at least three of said data processors are coupled to three different said slave port means of said multiplexer means, each said data processor being so coupled by a said bi-directional communication link.

* * * * *

UNITED STATES PATENT AND TRADEMARK OFFICE
CERTIFICATE OF CORRECTION

PATENT NO. : 4,890,279

DATED : December 26, 1989

INVENTOR(S) : Daniel P. Lubarsky

It is certified that error appears in the above-identified patent and that said Letters Patent is hereby corrected as shown below:

Column 1, line 39, delete "sleeve" and insert therefor --slave--.

Column 3, line 10, delete "26" and insert therefor --25--.

Column 3, line 37, delete "geographical" and insert therefor --geographic--.

Column 8, line 49, delete "loop" and insert therefor --looped--.

Signed and Sealed this

Tenth Day of December, 1991

Attest:

HARRY F. MANBECK, JR.

*Attesting Officer*          *Commissioner of Patents and Trademarks*